UNITED STATES PATENT OFFICE.

WILLIAM EDWIN HARRIS, OF NILES, OHIO.

COMPOSITION OF MATTER FOR TREATING SHEET METAL.

SPECIFICATION forming part of Letters Patent No. 585,098, dated June 22, 1897.

Application filed October 12, 1896. Serial No. 608,672. (No specimens.)

*To all whom it may concern:*

Be it known that I, WILLIAM EDWIN HARRIS, a citizen of the United States, residing at Niles, Trumbull county, State of Ohio, have invented a certain new and useful Improvement in Compositions of Matter for Treating Sheet Metal, of which the following is a full, clear, and exact description.

My present invention relates to a new composition of matter for treating sheet metal in a similar manner to that described in my Letters Patent No. 559,705, dated May 5, 1896.

My invention consists in features of novelty hereinafter fully described, and pointed out in the claim.

In employing my improved composition the apparatus shown and described in the patent hereinbefore mentioned may be employed or any other suitable apparatus may be used.

The composition of matter is composed of equal parts of pulverized iron ore, (preferably Lake Superior magnetic ore,) plumbago, and pulverized silicate compound, which latter ingredient, in chemical analysis, has been found to contain the following substances, in approximately the proportions named, to wit: moisture, 2.21 per cent.; silica, 73.06 per cent.; oxid of iron aluminium, 14.02 per cent.; lime, 1.02 per cent.; magnesia, .17 per cent.; potash, 5.35 per cent.; soda, 3.31 per cent.; other material undetermined, .86 per cent.

In the use of my improved composition the composition, after being thoroughly mixed, is distributed evenly upon the sheets of metal, and the sheets are then annealed in a suitable furnace.

I claim as my invention—

The herein-described composition of matter for treating sheet metal, consisting of pulverized iron ore, plumbago, and the mineral known as "diamond-dust" which contains substantially the following substances: moisture, 2.21 per cent.; silica, 73.06 per cent.; oxid of iron aluminium, 14.02 per cent.; lime, 1.02 per cent.; magnesia, .17 per cent.; potash, 5.35 per cent.; soda, 3.31 per cent.; other material undetermined, .86 per cent.

WILLIAM EDWIN HARRIS.

In presence of—
GEORGE L. CAMPBELL,
W. H. SMILEY.